US010270698B2

(12) United States Patent
Girard-Claudon et al.

(10) Patent No.: US 10,270,698 B2
(45) Date of Patent: Apr. 23, 2019

(54) SYSTEM OF SENSORS INTEGRATED INTO A SUITE

(71) Applicant: THALES, Courbevoie (FR)

(72) Inventors: Raphaël Raoul Adrien Girard-Claudon, Elancourt (FR); Luc Claude Chabod, Elancourt (FR)

(73) Assignee: THALES, Courbevoie (FR)

( * ) Notice: Subject to any disclaimer, the term of this patent is extended or adjusted under 35 U.S.C. 154(b) by 2 days.

(21) Appl. No.: 14/758,485

(22) PCT Filed: Jan. 10, 2014

(86) PCT No.: PCT/EP2014/050412
§ 371 (c)(1),
(2) Date: Jun. 29, 2015

(87) PCT Pub. No.: WO2014/111319
PCT Pub. Date: Jul. 24, 2014

(65) Prior Publication Data
US 2015/0358242 A1 Dec. 10, 2015

(30) Foreign Application Priority Data

Jan. 16, 2013 (FR) ..................................... 13 00085

(51) Int. Cl.
*G08B 29/18* (2006.01)
*H04L 29/08* (2006.01)
(Continued)

(52) U.S. Cl.
CPC .......... *H04L 47/2408* (2013.01); *H04L 47/80* (2013.01); *H04L 67/12* (2013.01); *G08B 29/188* (2013.01)

(58) Field of Classification Search
CPC ..... H04L 43/16; H04L 47/2408; H04L 47/80; H04L 63/0428; H04L 41/069; H04L 1/0003; H04L 1/0026; H04L 1/0025; H04L 1/1854; H04L 1/1887; H04L 2001/0097; H04L 5/0035; H04L 5/0048; H04L 5/14; H04W 24/00; H04W 74/004; H04B 3/46;
(Continued)

(56) References Cited

U.S. PATENT DOCUMENTS 7,076,253 B2 * 7/2006 Fisher .................. H04W 88/02
370/328
7,333,825 B2 * 2/2008 Hamiti ................ H04W 74/004
455/450
(Continued)

FOREIGN PATENT DOCUMENTS

FR 20080055912 * 9/2008 ............. G08B 17/00
FR 2 935 860 A1 3/2010
(Continued)

*Primary Examiner* — Sargon N Nano
(74) *Attorney, Agent, or Firm* — Baker & Hostetler LLP (57) ABSTRACT

Sensors and a central body are capable of exchanging bidirectional data via a main communication network, and the data from said sensors is classified according to different information levels (resource/environment, enriched data/ raw information), and at least two sensors are connected by a communication network in order to exchange data directly via one or more communication links, one link being associated with each information level.

20 Claims, 4 Drawing Sheets

(51) Int. Cl.
*H04L 12/851* (2013.01)
*H04L 12/927* (2013.01)

(58) Field of Classification Search
CPC .............. H04B 17/24; H04M 1/72533; A61B 2562/08; G01D 4/002; G01D 4/006; G16H 40/67
See application file for complete search history.

(56) References Cited

U.S. PATENT DOCUMENTS

| | | | |
|---|---|---|---|
| 7,450,006 B1 | 11/2008 | Doyle et al. | |
| 9,414,314 B2* | 8/2016 | Rudolf | H04W 72/0413 |
| 9,600,989 B2* | 3/2017 | Fadell | G08B 21/22 |
| 9,697,713 B2* | 7/2017 | Fadell | G08B 21/22 |
| 2004/0007121 A1 | 1/2004 | Graves et al. | |
| 2006/0098927 A1* | 5/2006 | Schmidt | G01N 21/0303 385/129 |
| 2007/0171042 A1* | 7/2007 | Metes | A62B 99/00 340/521 |
| 2008/0036593 A1* | 2/2008 | Rose-Pehrsson | G08B 17/00 340/540 |
| 2009/0128399 A1* | 5/2009 | Root, Jr. | F41G 3/04 342/176 |
| 2009/0228726 A1* | 9/2009 | Malik | G06F 1/3203 713/320 |
| 2010/0211359 A1 | 8/2010 | Mehta | |
| 2011/0193677 A1* | 8/2011 | Ho | H04W 12/10 340/3.1 |
| 2012/0102409 A1* | 4/2012 | Fan | H04W 4/00 715/738 |
| 2012/0213061 A1* | 8/2012 | Chen | H04W 16/14 370/227 |
| 2014/0125359 A1* | 5/2014 | El-Gamal | G01N 27/223 324/664 |
| 2014/0312242 A1* | 10/2014 | Valentino | G01P 13/00 250/395 |
| 2016/0253740 A1* | 9/2016 | Goulart | G06Q 30/0635 |

FOREIGN PATENT DOCUMENTS

| | | | | |
|---|---|---|---|---|
| FR | 2935860 | * | 3/2010 | ............. G08B 17/00 |
| KR | 20120088294 A | | 8/2012 | |

* cited by examiner

SYSTEM OF SENSORS INTEGRATED INTO A SUITE

CROSS-REFERENCE TO RELATED APPLICATIONS

This application is a National Stage of International patent application PCT/EP2014/050412, filed on Jan. 10, 2014, which claims priority to foreign French patent application No. FR 1300085, filed on Jan. 16, 2013, the disclosures of which are incorporated by reference in their entirety.

FIELD OF THE INVENTION

The present invention relates to a system of sensors integrated into a suite. It is applicable, notably, to the field of sensors linked to a mission or combat system, where these sensors may be of any kind, for example radar, ESM, optronic or telecommunications sensors. The invention is applicable to the federation of separate sensors, but also to the architecture of multi-function sensors.

BACKGROUND

A problem still to be overcome is that of improving the coordination between the sensors within a platform, or by extension to sensors on multiple platforms. This improvement is essential in order to obtain greater benefit from the information collected by each sensor, while also providing better coordination of the resources used by the sensors, such as, notably, time, frequency, or energy consumption.

In prior art solutions, combat or surveillance platforms carry sensors of various kinds which are controlled by a mission system. Each sensor receives its commands from the system which defines its operating mode at a given instant, and the sensor then sends more or less pre-processed data by return. These data are then fused by the mission system to develop a global tactical situation, and this situation can be shared between platforms.

The existing solutions are therefore of a pyramidal type, in that the flow of commands and results is vertical.

These solutions have a number of drawbacks; in particular,
- the observation, decision and action loops cannot be short, although certain new functions require very high reactivity between sensors and actuators;
- the amount of information that the sensors can exchange is limited because of the bandwidth of the links between levels, making fine synchronization impossible;
- the architectures of the sensor systems are frequently dependent on the host platform, making these systems less generic and limiting their portability to other platforms.

SUMMARY OF THE INVENTION

One object of the invention is, notably, to overcome the aforesaid drawbacks, and to this end the invention relates to a system of sensors integrated into a communicating suite, said sensors being capable of exchanging bidirectional data with a body via a main communication network, the data from said sensors being classified according to different information levels, at least two sensors being connected by a communication network in order to exchange data directly via one or more communication links, one link being associated with each information level.

Said sensors have at least one information level of a decision type and one information level of a logical type, one link being, for example, dedicated to decision information while one link is dedicated to logical information.

Information of the decision type comprises, for example, information about the internal state of said sensors, or information for managing the allocated resources.

The allocated resources are, for example, included in the following list: time, space, electromagnetic spectrum, optical spectrum, transmitted power, energy consumption, thermal conditioning of the sensors, and computing and processing power.

Information of the logical type comprises, for example, synchronization data or the results of detection produced by said sensors.

For example, one communication channel is reserved for each information level.

Data from at least one other information level are exchanged between sensors by passing through the link associated with the logical information level, said data having been converted in advance to logical data.

For example, information of a physical type, captured by said sensors, is exchanged via the link associated with the logical information level.

For example, information of a functional type is exchanged via the link associated with the logical information level.

The links between sensors associated with each information level and the exchange formats are, for example, standardized.

The information exchanges take place, for example, according to auto-descriptive formats.

In a specific embodiment, the system comprises multi-function sensors.

BRIEF DESCRIPTION OF THE DRAWINGS

Other characteristics and advantages of the invention will be evident from the following description, referring to the attached drawings which show.

DETAILED DESCRIPTION

Figure 1:
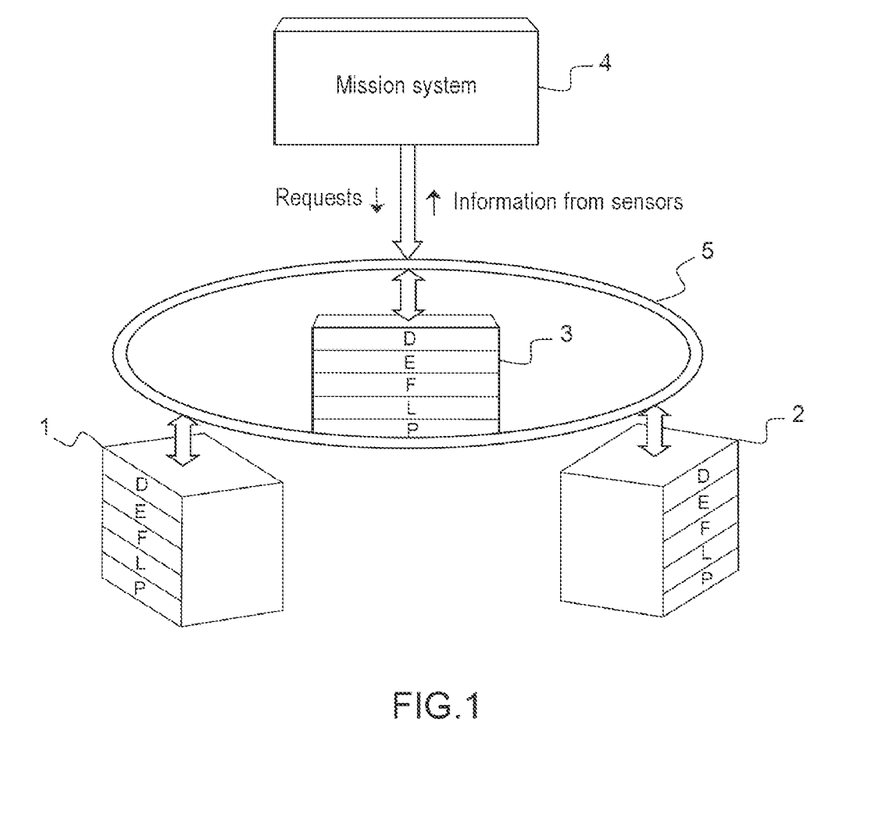
in FIG. 1, an illustration of a system of sensors integrated into a suite according to the prior art.

FIG. 1 shows a sensor system according to the prior art. Suites of sensors federated by a central body give rise to problems, as shown by the limitations identified below:
- the requirements of combat or surveillance platforms are such that new capacity is needed in terms of, notably, reactivity, autonomy, flexibility, secrecy, inter-carrier interaction or robustness;
- these requirements will be manifested in two major developments of sensor equipment, namely increased autonomy and intelligence of the sensors, combined with greater coordination between sensors;
- federated architectures will not meet these requirements, because the data and decisions are decentralized by mission systems, thus limiting the richness of exchanges and the virtually exclusive allocation of resources;

the sensors are engineered separately and there is no single model for dealing with the operation of a suite of sensors as a whole.

The system of FIG. 1 includes, by way of example, three sensors 1, 2, 3 federated by a central body 4, in this case a mission system. The requests supplied by the mission system 4 travel via a bus or communication network 5 connected to each sensor 1, 2, 3. Similarly, the sensors supply their information to the mission system 4 via this bus 5. There is virtually no link between the sensors, control being provided by the mission system 4.

The known solutions generally tackle the problem of the coordinated operation of sensors in a partial manner.

The method called JDL, from the English expression "Joint Directors of Laboratories", use a mechanism based on sensor results, but it is very much focused on information-related aspects and is not easily applied to a sensor system architecture. A model derived from this, known as Waterfall, has the same limitations.

On the other hand, the method known as CODA, based on the English expression "Observe, Orientate, Decide, Act", or the Boyd model uses time loops related to the missions, but cannot be used to deal with the diffusion of resource allocation or the escalation of information in a system. The Omnibus model which is derived from this has the same limitations.

The models known as USAF, from the expression "US Air Force", and the model known as LAAS, from the expression "Laboratoire d'Analyse et d'Architecture de Systemes", have an increased degree of richness. They incorporate the diffusion of commands and escalation of results in a sensor system, and decision loops are present at the level of an operational function or, more globally, a mission. However, they do not allow for the fine coordination loops that must be present between functions of different sensors (regardless of whether they are of the same kind or of different kinds) of the types expected in the future.

As mentioned above, the known solutions are unsatisfactory. This is because one of the distinctive features of sensors such as radar, ESM or optronic sensors is that they manipulate synchronization data and information (clocks, latencies, etc.) with very fine time scales, down to the level of a few nanoseconds.

The coordination of these sensors is dependent on a capacity to share this information, which is not feasible where exchanges travel at a higher level without calling into question the control and acquisition of the individual performances of the sensors. For example, in the LAAS model two physical sensors at the lower level P are coordinated solely at the functional level, or possibly at the decision level. Similarly, in the USAF model, the sensors do indeed have control loops at the lower level of the model, but these loops only connect the resources and results of a single given sensor.

If it is desired, for example, to exchange plots between two radar systems, or to use a signal received by a radar antenna to perform an ESM detection, the conventional architectures are not capable of this.

Finally, if it is desired to communicate the fine sequencing tables of a radar system to an ESM sensor with the aim of improving electromagnetic compatibility, this is not possible.

Figure 2A:
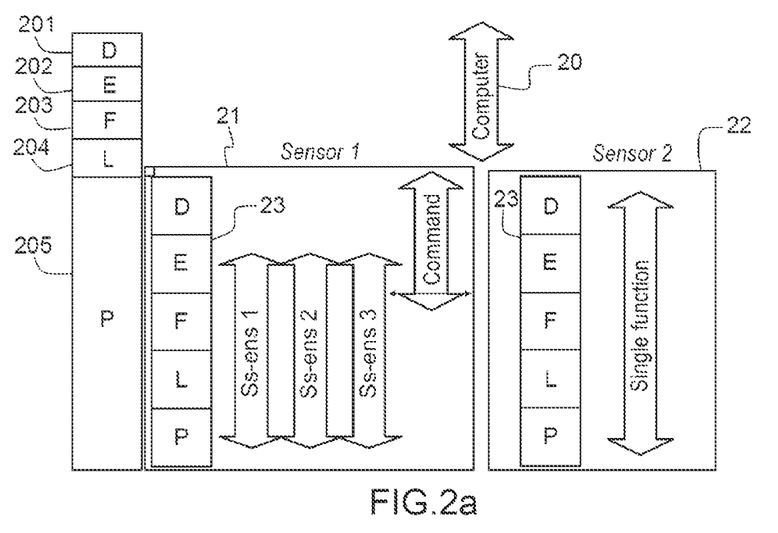
in FIGS. 2a and 2b, an exemplary embodiment of the prior art with two sensors.
Figure 2B:
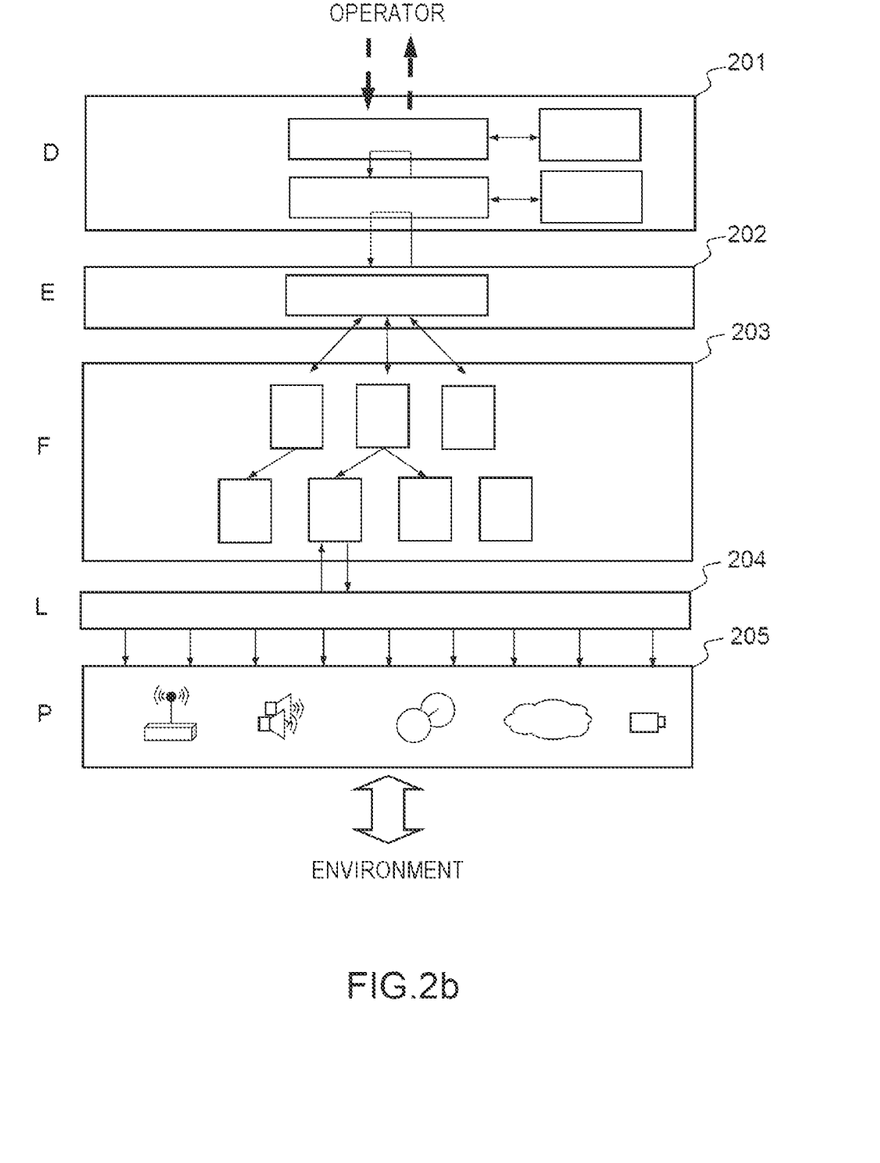

FIGS. 2a and 2b show a system of federated sensors; more particularly, it shows an example with two sensors 21, 22 federated by a mission computer 20. In the rest of the description, the conventional LAAS model is used by way of example and for reasons of simplicity to describe a sensor architecture according to the invention. The LAAS model, originally used in robotics, defines five levels for linking a commander to dedicated physical means. The commander is, for example, a control system or a user. The dedicated physical means are, for example, sensors or actuators. These levels are:
  level D: Decision
  level E: Execution
  level F: Functions
  level L: Logical
  level P: Physical This model is, for example, adaptable to a combat aircraft, in which case level P contains the various sensors of the platform (optical, radar, various detectors, probes, ESM, etc.). In the example of FIGS. 2a and 2b, level P contains two sensors 21, 22.

It should be noted that this is a nested model: that is to say, the sensors also have an internal decision structure 23 with levels D, E, F, L and P, this structure being more or less formalized according to the degree of complexity of the sensors.

In a conventional architecture, these levels D, E, F, L and P have virtually no communication with a similar level of another sensor, except via highly specific signals which are very few in number.

According to the invention, two levels of standardized communications are created between sensors:
  a decision level, at level D (possibly transiting via level E in some variants of the invention), which will convey information enabling the sensors to optimize their combined operation, this information consisting of requests, internal state information, or performance control information, for example;
  a logical level, at level L, which will carry information at a higher bit rate, this information consisting of synchronization data and detection results which have been pre-processed to a greater or lesser extent.

Figure 3:
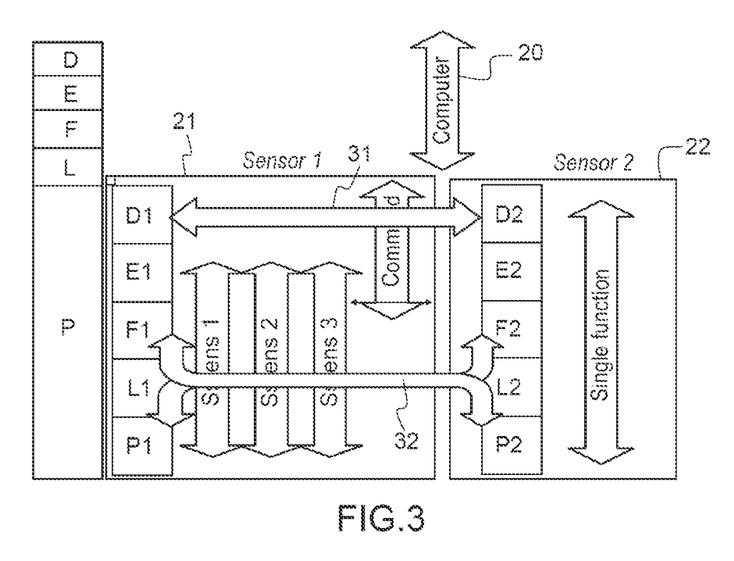
in FIG. 3, an exemplary embodiment of the invention in the case of FIGS. 2a and 2b.

FIG. 3 shows an exemplary embodiment of the invention in the case of the example of the system of FIGS. 2a and 2b, with the two sensors 21, 23 federated by the mission computer 20.

A first communication level 31 links level D of the first sensor 21 to level D of the second sensor 22. A second communication level links level L of the first sensor 21 to level L of the second sensor 22.

Levels F and P do not directly exchange information between the sensors 21, 22. All transmission between the sensors for these levels F and P takes place at level L, as shown in FIG. 3. This choice provides a separation between the specific features of the sensors and the kind of information transmitted.

For example, if the first sensor 21 is required to transmit sampled data to the second sensor 22, its logical level layer L, denoted L1, formats the data obtained from its physical layer P, denoted P1. The layer L1 then transmits the data formatted in logical form to the logical layer L, denoted L2, of the second sensor, for use by one or more functions of the function layer F, denoted F2, of the second sensor. Thus the data P1, physical data from the first sensor 21 for example, are transmitted to one or more functions F2 of the second sensor 22 for use or analysis.

Similarly, if an analysis result of a function of the first sensor, denoted F1, is to be transmitted to the second sensor, the information path is, for example, F1, L1, L2, F2.

The information exchanges at level L take place, for example, in auto-descriptive formats; that is to say, the description of the data formats is contained in the transmission itself.

The decision levels D, denoted D1 and D2, of the sensors can also exchange information of a more macroscopic kind, such as medium- or long-term planning of sensor functions, final results of sensor processing, or a global view of the environment.

The invention makes it possible to meet the new requirements of sensor systems. This is because the communications established between the sensors 21, 22 enable at least four categories of necessary information to be exchanged.

As regards information about the environment or situation, the communications at the decision level D make it possible to exchange fine information on the situation between sensors in real time, resulting in more efficient operation of each sensor.

As regards the resource requirements, the decision communications D (or at level E in some cases) enable fine information to be exchanged between sensors about their present and future consumption of resources, so that their allocation can be optimized. These resources are, notably, time, space, the frequency or optical spectrum, the transmitted power, the energy consumption, the thermal conditioning of the sensors, or the computing and processing power. However, this list is not exhaustive.

As regards data, the communications at the logical level L can be used to exchange data at the intermediate level between sensors, providing enhanced reactivity in terms of tracking, target designation, or identification. These intermediate data may be radar plots or images designating areas of interest, for example. Obviously, other types of intermediate data may be exchanged.

As regards the signals or samples, the communications at the logical level L enable raw digital signals from the outputs of the encoders to be exchanged between sensors, and these signals can be used by the other sensor or other sensors.

Figure 4:
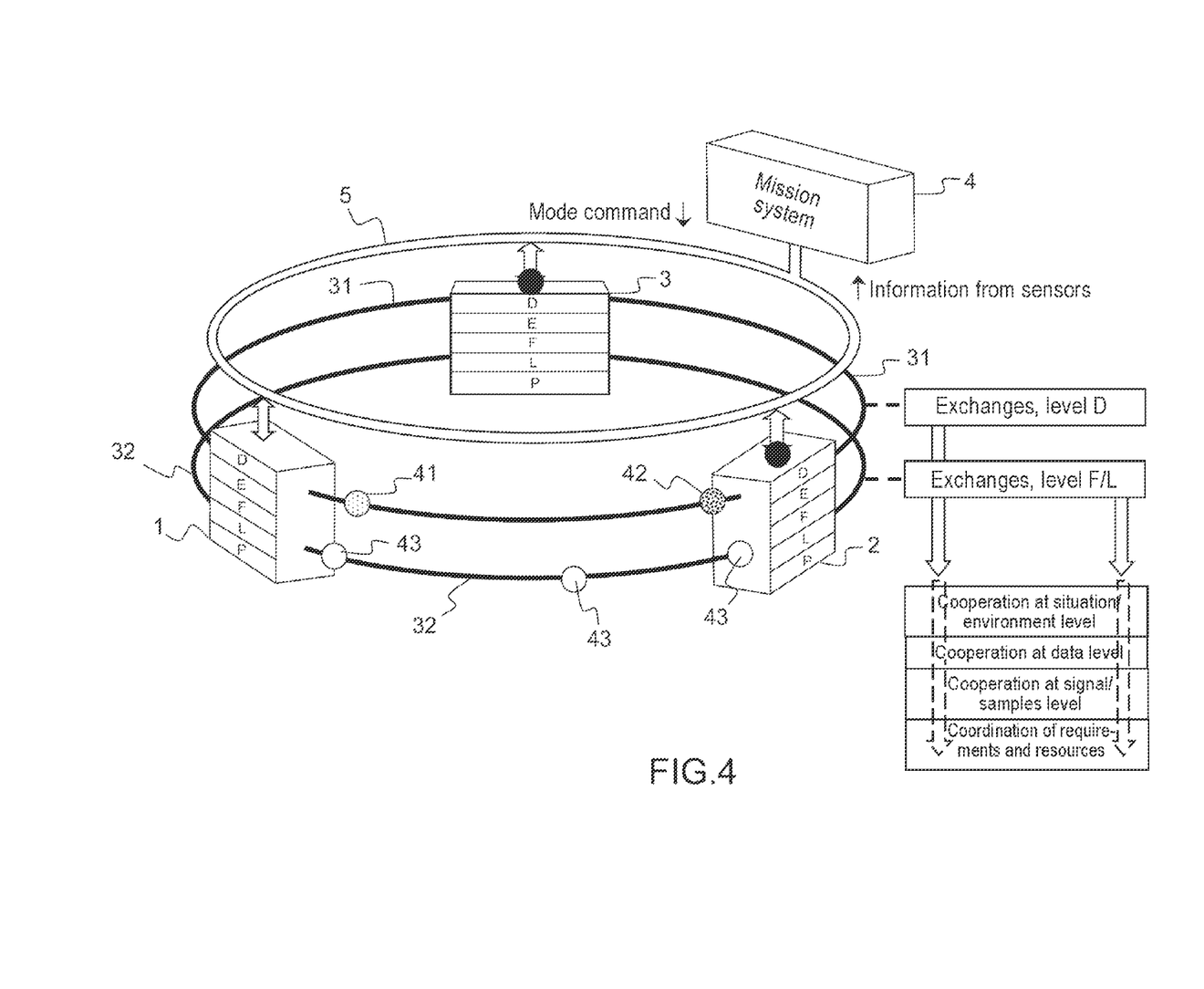
in FIG. 4, an exemplary embodiment of a system according to the invention.

FIG. 4 shows an example of systems of communicating sensors according to the invention, federated by a mission system 4. By way of example, the architecture returns to the basic layout of FIG. 1 with three sensors 1, 2, 3. As in FIG. 3, the sensors have a decision structure D, E, F, L, P which is more or less formalized, depending on their complexity.

The establishment of communication between the sensors may relate to existing sensors or new sensors. It comprises the following steps:

Bringing the functional architecture of the chosen sensors into conformity with a single model, of which the LAAS model used in the example of FIG. 3 is a simple example, the invention also being applicable to other models as indicated below;

Establishing a physical network 31, 32 between the sensors 1, 2, 3, where the network may be based on a computing standard and may include wireless transmissions if the sensors are located on more than one platform. The computing standard may be of the high-speed low-latency type, such as an Ethernet or other wired system.

Modifying the functions of the sensors which can transmit coordination information to the other sensors or receive it therefrom, so as to add to them the data reading and writing capacity toward the logical layer L.

Adding standardized protocols to the logical layer L for the exchange of multi-sensor information.

In the example of FIG. 4, the mission system sends its requests to the sensors via the network 5, the main network, with which each sensor 1, 2, 3 is interfaced, where this network may be of the same type as the network 31, 32 interconnecting the sensors, for example a network of the Ethernet type. These requests may be, for example, operating mode commands. Similarly, the information transmitted by the sensors via the mission system travels through this main network 5.

FIG. 4 shows different possible forms of cooperation between sensors. At the decision level D, the situation and environment information 41 is exchanged, together with the resource requirement information 42. At the logical level L, the intermediate data 43 are exchanged, together with the raw signals or samples from the encoders. The information at the physical level P or the functional level F is also exchanged via the logical level L.

The invention has been described for an architecture based on an LAAS model, but can be applied to other models. More generally, the invention uses a set of direct coordination protocols between the sensors, each protocol carrying one class of information. In the preceding example, the information classes correspond to levels D and L. These protocols can be deployed on a single bus or on a number of dedicated buses 31, 32, each bus then being dedicated to one information class. An exchange rule is established for each protocol. The exchange protocols are thus established for at least two specific information classes in the architecture of the sensors, the information at the decision level and the information at the service abstraction level corresponding, respectively, to the decision level D and the logical level L in the LAAS example given above. Finally, the nature of the information which is to pass between the sensors is characterized according to the selected levels, D and L for example.

By means of the direct links 31, 32 between the sensors, it is possible, notably, to increase their synergy and to create short sensor level loops, leading to enhanced reactivity. These links carry information of various kinds at various speeds and with various latencies. They are, for example, associated with a structure of standardized functions for all the sensors in the system, so that links are established for uniform levels between sensors, at the decision level or the logical level for example.

More particularly, the inter-sensor links, designed to be high-speed and low-latency, can advantageously carry open loop coordination information. This information, of a first class, is used for the real time management of resource allocation, particularly time and frequency sharing for radar applications, for example. This information, of a second class, is also used to enrich, in an interlinked way, the processing carried out by the sensors and the perception of the environment. The links 31, 32 between sensors are, for example, standardized by using standard physical media and protocols, allowing new sensors to be added to an existing network. The exchange formats are also, for example, standardized and based on specific layers of the architecture of each sensor, to allow each of these sensors to access information from other sensors while being independent of the hardware.

The invention provides, notably, the following advantages:

Compatibility with the architecture of existing sensors: the control of the sensors by the command body, the mission system 4 for example, may remain fairly similar to the existing system, the new links 31, 32 being transparent while allowing enhanced performance and/or enriched information to be obtained;

Possibility of development toward integrated multi-function architectures. Indeed, since the solution provided by the invention is functional, it can be applied to sensor suites with the links formed by physical buses or wireless links;

Standardization of the interfaces between the functions and resources of the sensors, encouraging the re-use of developments and the creation of building bricks for sensor products;

Possibility of sharing resources between sensors, since a level F function of a first sensor can be executed on another sensor provided that the necessary data are exchanged via layer L;

Provision for rational organization of the verification and validation processes for a sensor system, by allowing for the organization and isolation of separate functional chains, controlled by a predictable global control function.

The invention can also be applied to a system of integrated multi-function sensors. In an embodiment of this type, the physical elements making up the suite of sensors can be shared, and therefore the functions forming levels P to D are not necessarily implemented in separate elements. For example, digital functions can be centralized in a single sensor. In this case, the cooperation described above is still established; in particular, the links are created but may be local, between neighboring functions.

Advantageously, the system may comprise a suite of RF or optronic sensors fitted to a surveillance or mission platform.

The description has been given by way of example, with sensor information classed as type D, E, F, L and P information, but the invention is applicable to all other types of classification, provided that the data are classified according to different information levels. Regardless of the set of different information levels, the information exchange between sensors advantageously takes place via the decision and logical levels.

The invention claimed is:

1. A system of sensors integrated into a communicating suite, said system of sensors comprising:
    a main communication network connecting said sensors to a mission system;
    said sensors configured to exchange bidirectional data with the mission system via the main communication network, the data from said sensors being classified according to different information levels;
    a sensor communication network connecting to at least two of the sensors, said sensor communication network being implemented separate from the main communication network;
    at least one of the at least two sensors being configured to generate sensor data;
    at least another one of the at least two sensors being configured to operate in response to receiving the sensor data; and
    the at least two sensors are connected by the sensor communication network and the least two sensors are configured to exchange the sensor data directly via one or more communication links of the sensor communication network, one link of the one or more communication links being configured and associated with each information level.

2. The system as claimed in claim 1, wherein the sensor data exchanged between said at least two sensors comprising at least one information level of a decision type and one information level of a logical type,
    wherein one link of the one or more communication links is configured for and dedicated to information of a decision type, and
    wherein one link of the one or more communication links is configured for and dedicated to information of a logical type.

3. The system as claimed in claim 2, wherein the information of the decision type comprises information on an internal state of said at least two sensors.

4. The system as claimed in claim 2, wherein the information of the decision type comprises information on a control of allocated resources.

5. The system as claimed in claim 4, wherein the allocated resources comprises at least one of the following: time, space, electromagnetic spectrum, optical spectrum, transmitted power, energy consumption, thermal conditioning of the sensors, and computing and processing power.

6. The system as claimed in claim 2, wherein the information of the logical type comprises synchronization data.

7. The system as claimed in claim 2, wherein the information of the logical type comprises detection results produced by said at least two sensors.

8. The system as claimed in claim 2, wherein one communication channel of the one or more communication links is reserved for each information level.

9. The system as claimed in claim 2, wherein data from at least one other information level is exchanged between the at least two sensors by passing through the link associated with the logical information level, said data having been converted in advance to logical data.

10. The system as claimed in claim 9, wherein the information of a physical type, captured by said at least two sensors, is exchanged via the link associated with the logical information level.

11. The system as claimed in claim 9, wherein the information of a functional type is exchanged via the link associated with the logical information level.

12. The system as claimed in claim 1, wherein the links between the at least two sensors associated with each information level and exchange formats are standardized.

13. The system as claimed in claim 12, wherein the at least two sensors are configured such that the information exchanges take place in auto-descriptive formats.

14. The system as claimed in claim 1, wherein the at least two sensors further comprise multi-function sensors.

15. The system as claimed in claim 1,
    wherein the sensor communication network comprises a plurality of sensor communication networks; and
    wherein each of the plurality of sensor communication networks are configured and associated each with a different information level.

16. The system as claimed in claim 1,
    wherein at least one of the sensors is configured to transmit coordination information;
    wherein at least one of the sensors is configured to receive coordination information; and
    wherein the sensor communication network is configured to exchange the coordination information between the sensors.

17. A system of sensors integrated into a communicating suite, said system of sensors comprising:
    a main communication network connecting said sensors to a mission system;
    said sensors configured to exchange bidirectional data with the mission system via the main communication network, the data from said sensors being classified according to different information levels;

a sensor communication network connecting to at least two of the sensors, said sensor communication network being implemented separate from the main communication network;

at least one of the at least two sensors being configured to generate sensor data;

at least another one of the at least two sensors being configured to operate in response to receiving the sensor data; and the at least two sensors are connected by the sensor communication network and the least two sensors are configured to exchange the sensor data directly via one of a plurality of communication links of the sensor communication network, each link of the plurality of communication links being configured and associated with the different information levels.

18. The system as claimed in claim 17, wherein the sensor data exchanged between said at least two sensors comprising at least one information level of a decision type and one information level of a logical type, wherein one link of the one or more communication links is configured for and dedicated to information of a decision type, wherein one link of the one or more communication links is configured for and dedicated to information of a logical type, wherein the information of the decision type comprises information on an internal state of said at least two sensors, and wherein the information of the decision type comprises information on a control of allocated resources.

19. The system as claimed in claim 17, wherein the sensor communication network comprises a plurality of sensor communication networks; and wherein each of the plurality of sensor communication networks are configured and associated each with a different information level.

20. The system as claimed in claim 17, wherein at least one of the sensors is configured to transmit coordination information;

wherein at least one of the sensors is configured to receive coordination information; and wherein the sensor communication network is configured to exchange the coordination information between the sensors.

* * * * *